(12) United States Patent
Glotzbach et al.

(10) Patent No.: US 10,949,959 B2
(45) Date of Patent: Mar. 16, 2021

(54) PROCESSING IMAGE DATA IN A COMPOSITE IMAGE (71) Applicants: John W Glotzbach, Allen, TX (US); Ruiwen Zhen, Richardson, TX (US); Ibrahim Pekkucuksen, Plano, TX (US); Hamid Rahim Sheikh, Allen, TX (US)

(72) Inventors: John W Glotzbach, Allen, TX (US); Ruiwen Zhen, Richardson, TX (US); Ibrahim Pekkucuksen, Plano, TX (US); Hamid Rahim Sheikh, Allen, TX (US)

(73) Assignee: Samsung Electronics Co., Ltd., Suwon-Si (KR)

(*) Notice: Subject to any disclaimer, the term of this patent is extended or adjusted under 35 U.S.C. 154(b) by 70 days.

(21) Appl. No.: 16/278,209

(22) Filed: Feb. 18, 2019

(65) Prior Publication Data

US 2020/0265566 A1 Aug. 20, 2020

(51) Int. Cl.
*G06T 5/50* (2006.01)
*G06T 7/13* (2017.01)
*G06T 7/00* (2017.01)
*G06T 5/00* (2006.01)

(52) U.S. Cl.
CPC ............... *G06T 5/50* (2013.01); *G06T 5/002* (2013.01); *G06T 7/0002* (2013.01); *G06T 7/13* (2017.01); *G06T 2207/20016* (2013.01); *G06T 2207/20221* (2013.01); *G06T 2207/30168* (2013.01)

(58) Field of Classification Search
CPC .. G06T 5/50; G06T 7/13; G06T 5/002; G06T 7/0002
See application file for complete search history.

(56) References Cited

U.S. PATENT DOCUMENTS 6,359,617 B1 * 3/2002 Xiong ................... G06T 3/0068
715/848
8,340,415 B2 12/2012 Hoppe et al.
8,639,056 B2 1/2014 Zhai
(Continued)

FOREIGN PATENT DOCUMENTS

JP 2008165312 7/2008
KR 10-1767094 8/2017
KR 1828180 2/2018

OTHER PUBLICATIONS

Raanan Fattal, Dani Lischinski, and Michael Werman. 2002. Gradient domain high dynamic range compression. In Proceedings of the 29th annual conference on Computer graphics and interactive techniques (SIGGRAPH '02). (Year: 2002).*
(Continued)

*Primary Examiner* — Utpal D Shah
(74) *Attorney, Agent, or Firm* — John J. King (57) ABSTRACT

A method of processing image data in a composite image is described. The method comprises analyzing a multi-level blending of images of the composite image; identifying sharp transition boundary areas of the composite image; applying less attenuation for higher levels of multi-level blending of the composite image in the sharp transition boundary areas; and applying more attenuation for lower levels of multi-level blending of the composite image in the sharp transition boundary areas.

20 Claims, 4 Drawing Sheets

(56) References Cited

U.S. PATENT DOCUMENTS

| | | | |
|---|---|---|---|
| 8,811,764 B1* | 8/2014 | Hsu | G06K 9/6289 |
| | | | 382/260 |
| 9,158,989 B1* | 10/2015 | Stein | G06T 5/002 |
| 9,369,684 B2 | 6/2016 | Lim | |
| 9,390,482 B2 | 7/2016 | Lee | |
| 9,600,741 B1 | 3/2017 | Su et al. | |
| 9,621,767 B1* | 4/2017 | El Mezeni | H04N 19/186 |
| 2003/0228064 A1* | 12/2003 | Gindele | G06T 5/50 |
| | | | 382/260 |
| 2005/0254722 A1* | 11/2005 | Fattal | G06T 5/009 |
| | | | 382/274 |
| 2010/0183222 A1* | 7/2010 | Fattal | G06T 5/10 |
| | | | 382/166 |
| 2010/0310189 A1* | 12/2010 | Wakazono | G06T 5/008 |
| | | | 382/258 |
| 2013/0202204 A1 | 8/2013 | Yamonaka | |
| 2014/0064632 A1* | 3/2014 | Manabe | G06T 5/009 |
| | | | 382/254 |
| 2014/0153820 A1 | 6/2014 | Lee | |
| 2014/0354892 A1 | 12/2014 | Moon | |
| 2015/0002704 A1* | 1/2015 | Vidal-Naquet | G06T 5/50 |
| | | | 348/241 |
| 2015/0078676 A1* | 3/2015 | Arai | G06T 5/10 |
| | | | 382/260 |
| 2016/0014336 A1 | 1/2016 | Han | |
| 2017/0069060 A1* | 3/2017 | Baqai | G06T 5/009 |
| 2017/0352131 A1* | 12/2017 | Berlin | G06T 5/001 |
| 2018/0063441 A1 | 3/2018 | Molgaard et al. | |
| 2019/0347777 A1* | 11/2019 | Meng | G06T 5/009 |
| 2020/0186710 A1* | 6/2020 | Sheikh | H04N 5/23299 |

OTHER PUBLICATIONS

S. Keerativittayanun, T. Kondo, K. Kotani and T. Phatrapornnant, "An innovative of pyramid-based fusion for generating the HDR images in common display devices," 2015 14th IAPR International Conference on Machine Vision Applications (MVA), Tokyo, 2015, pp. 53-56, (Year: 2015).*

Im Su Jin et al., A Pyramid Fusion Method of Two Differently Exposed Images Using Gray Pixel Values. Journal of Korea Multimedia Society. vol. 10 No. 8. Aug. 2016.

PCT/KR2019/007085, Notification of Transmittal of the International Search Report and the Written Opinion, dated Nov. 18, 2019.

PCT Search Report PCT/KR2019/007085 published 2019.

* cited by examiner

PROCESSING IMAGE DATA IN A COMPOSITE IMAGE

FIELD OF THE INVENTION

An embodiment of the invention relates generally to devices having multiple cameras, and in particular, to devices for and methods of processing image data in a composite image.

BACKGROUND OF THE INVENTION

Digital cameras are electronic devices that capture an image that is stored in a digital format. Other electronic devices, such as smart phones, tablets or other portable devices, are often equipped with a camera to enable the capture of images in a digital format. As the demands for improved functionality of cameras or electronic devices having cameras has increased, multiple cameras having different functionality have been implemented in electronic devices. According to some implementations, a dual camera module in an electronic device may contain two different lenses/sensors, or may have different camera characteristics, such as exposure settings.

Many scenes captured by a device having digital cameras contain a very large dynamic range (i.e. both very bright and very dark areas exist in the same scene). It is difficult for a camera to record the scene using a single exposure, so multiple exposures are often used, where the image frames are combined using high dynamic range (HDR) algorithms. These algorithms may select parts of each image frame that is best exposed among the multiple exposures. These parts are composited together using blending. In blending, multiple image frames are combined together using corresponding blending weights to control how each frame should contribute to the final result. A specific artifact, known as the halo artifact, is often created around a transition point between light and dark areas of a scene.

Therefore, devices and methods of blending images that reduce transition artifacts such as the halo artifact is beneficial.

SUMMARY OF THE INVENTION

A method of processing image data in a composite image is described. The method comprises analyzing a multi-level blending of images of the composite image; identifying sharp transition boundary areas of the composite image; applying less attenuation for higher levels of multi-level blending of the composite image in the sharp transition boundary areas; and applying more attenuation for lower levels of multi-level blending of the composite image in the sharp transition boundary areas.

A device for enhancing quality of an image is also described. The device comprises a processor circuit configured to: analyze a multi-level blending of images of the composite image; identify sharp transition boundary areas of the composite image; apply less attenuation for higher levels of multi-level blending of the composite image in the sharp transition boundary areas; and apply more attenuation for lower levels of multi-level blending of the composite image in the sharp transition boundary areas.

A non-transitory computer-readable storage medium having data stored therein represents software executable by a computer for enhancing quality of an image, the non-transitory computer-readable storage medium comprises: analyzing a multi-level blending of images of the composite image; identifying sharp transition boundary areas of the composite image; applying less attenuation for higher levels of multi-level blending of the composite image in the sharp transition boundary areas; and applying more attenuation for lower levels of multi-level blending of the composite image in the sharp transition boundary areas.

DETAILED DESCRIPTION OF THE DRAWINGS

The devices and methods set forth below detect transition boundaries associated with a scene where the blending control may change quickly from a dark region to a bright region. After detection of the transition boundaries, the devices and methods provide control of the blending to suppress the halo artifact. The devices and methods may detect where the halo artifact will be created and control the blending to prevent the blended result from exhibiting halo artifact. For example, the devices and methods may look for large changes in the blending weights, where areas with large changes may mark the sharp transition boundaries. The circuits and methods may be beneficial when used with images having different exposures or for an image generated using a flash is blended with an image generated using no flash.

According to some implementations, the devices and methods provide an extension to pyramid blending, where detection may be applied at multiple levels of a blending pyramid. Fine details are recorded in the high-resolution levels of the blending pyramid. Less control is applied at these levels to avoid smoothing fine details in the output image. Large scale transitions are recorded in lower levels, so it is possible to apply detection and more attenuation, also known as suppression, in the areas detected in the lower levels to control the halo artifact. Therefore, the devices and methods allow halo attenuation to be performed in the pyramid without losing fine details in the output image. Attenuation may be applied at each level using controllable thresholds. The detail level in low resolution levels may be reduced at points where there is quick transition in the blending weights. Control adaptation may be based upon scene content. The devices and methods allow the halo region to be detected and control how much high-pass energy to pass to the output to avoid the halo overshoot and undershoot.

Further, while the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
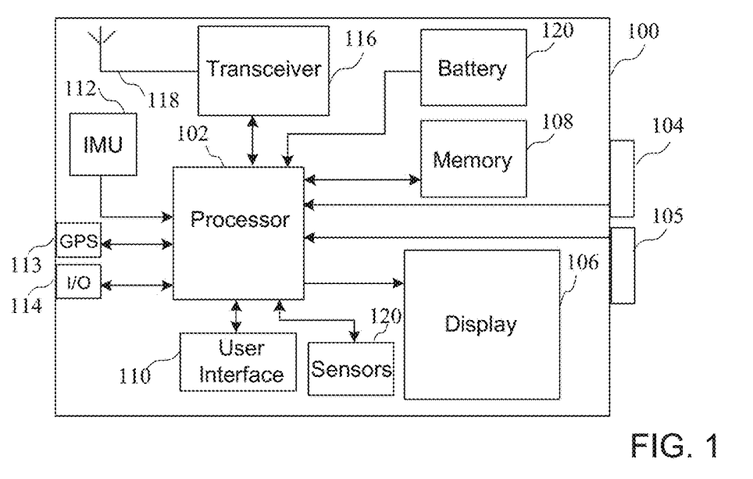
FIG. 1 is a block diagram of an exemplary electronic device having a plurality of cameras.

Turning first to FIG. 1, a block diagram of an electronic device having a plurality of cameras is shown. The electronic device, for example mobile device 100, that may be any type of device having one or more cameras. The mobile device 100 may comprise a processor 102 coupled to a plurality of cameras 104 and 105. The cameras 104 and 105 could have different characteristics, such as different focal lengths or different operating characteristics, such as different exposure times or the use of a different flash, where the blending of images may relate to images having different characteristics as described in more detail below. The mobile device 100 could be any type of device adapted to transmit and receive information, such as a smart phone, tablet or other electronic device receiving or providing information, such as a wearable device. The processor 102 could be an ARM processor, an X86 processor, a MIPS processor, a graphics processing unit (GPU), a general purpose GPU, or any other processor configured to execute instructions stored in a memory. The processor 102 could be implemented in one or more processing devices, where the processors may be different. For example, the electronic device could include a central processing unit (CPU) as well as a GPU for example. The operation of the processing circuit may rely upon both software and hardware to implement various features of the circuits and methods set forth below.

The processor 102 may be coupled to a display 106 for displaying information to a user. The processor 102 may also be coupled to a memory 108 that enables storing information related to data or information associated with image data. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic drive or external memory accessible by the electronic device.

A user interface 110 is also provided to enable a user to both input data and receive data. Some aspects of recording images may require user's manual input. The user interface 110 could include a touch screen user interface commonly used on a portable communication device, such as a smart phone, smart watch or tablet computer, and other input/output (I/O) elements, such as a speaker and a microphone. The user interface 110 could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 120, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor 102 may receive input data by way of an input/output (I/O) port 114 or a transceiver 116 coupled to an antenna 118. While the elements of the electronic device are shown by way of example, it should be understood that other elements could be implemented in the electronic device of FIG. 1, or electronic devices that are arranged differently to implement the methods set forth below. While a plurality of cameras is shown in FIG. 1, successive frames with different characteristics, such as different exposure characteristics, could be captured by a single camera. For example, multiple frames could come from a single camera that changes exposure between frames. It should be noted that, for any reference below to multiple images, a single camera or multiple cameras could be used to capture the multiple images.

Figure 2:
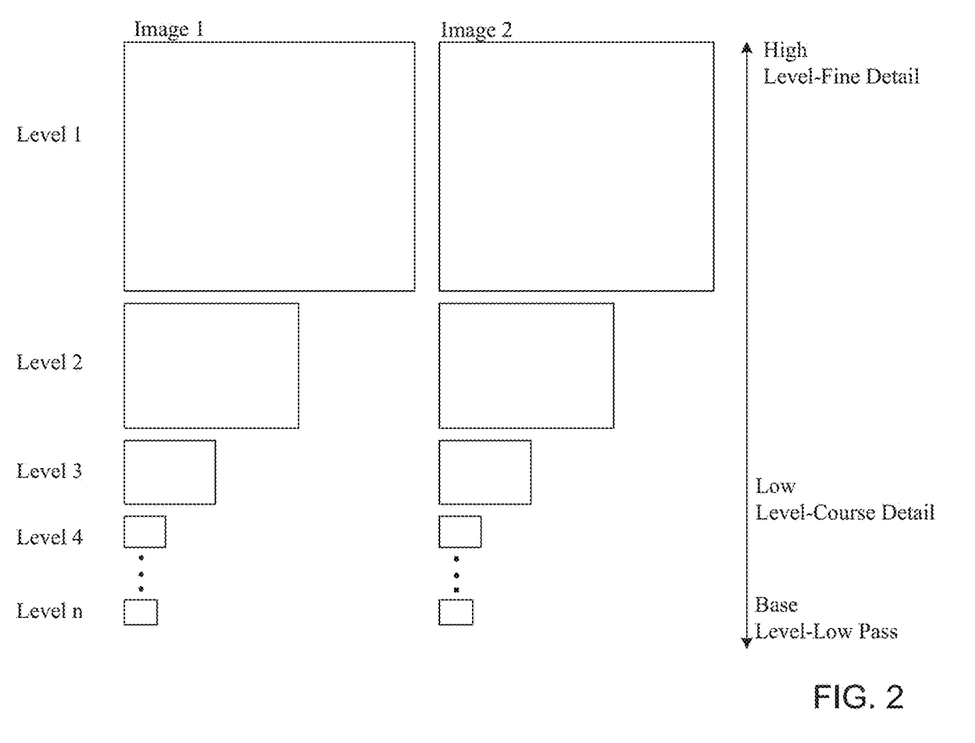
FIG. 2 is a diagram showing different levels associated with multiple images.

Turning now to FIG. 2, a diagram shows different levels associated with multiple images from different cameras, or from a single camera, where the multiple images captured by the single camera may have different exposure characteristics. According to some implementations, the different cameras may have different exposure times or different use of supplemental light, such as a flash. It should also be understood that each of the Image1 and Image 2 may be multi-frame images. To avoid transition artifacts, a multi-scale blending algorithm associated with the blending pyramids may be used. Conventional blending algorithms often have difficulty transitioning quickly between a dark region and a bright region. A specific artifact, known as halo is often created around this transition point between a dark region and a bright region. On the bright side of the transition, the blended result gets brighter, while on the dark side of the transition, the blended result becomes too dark. This area around a scene transition appears very unnatural, indicating synthetic processing may have been applied by the camera to generate the final image. The circuits and methods set forth in more detail below address this transition artifact to make the blended output result appear more natural.

According to some implementations, a circuit and method of implementing a blending pyramid accepts 2 different images, such as a long exposure input and a short exposure input along with a frame of blending weights, as will be described in more detail in reference to FIG. 3. A high weight for an image in a given level, shown here as having n levels, indicates that the blended result should use higher contribution from one of the images, such as the short exposure image. A low blending weight indicates that the blended result should use higher contribution from the other image, such as the long exposure image. The circuits and methods set forth below improve the output blended result in areas of the composite image where the blending weights quickly transitions from a low value to a high value.

According to the example of FIG. 2, n levels are provided, where a Level 1 provides a high level of detail and the level of resolution decreases to Level n, which represents a low-level pass, and may represent a base level. The resolution of the levels may be generated by downsampling, such as by reducing the resolution of an image by one-fourth for example, where the resolution of each of the height and weight dimensions would be reduced by 2, where only one-fourth of the pixels of the next higher resolution level would be used. That is, Level 2 may only have one-fourth the number of pixels associated with the image compared to Level 1. For example, for each image, for every square of 4 pixels of Level 1, only one of the pixels would be used to represent the image in Level 2, and for every square of 4 pixels of Level 2, only one pixel would be used to represent the image in Level 3, etc. The base image in Level n is a very low resolution image. While 2 images are shown by way of example, it should be understood that more than 2 images could be blended using the circuits and methods set forth below. More detail related to blending of the two images in a blending pyramid is provided in reference to FIG. 3.

Figure 3:
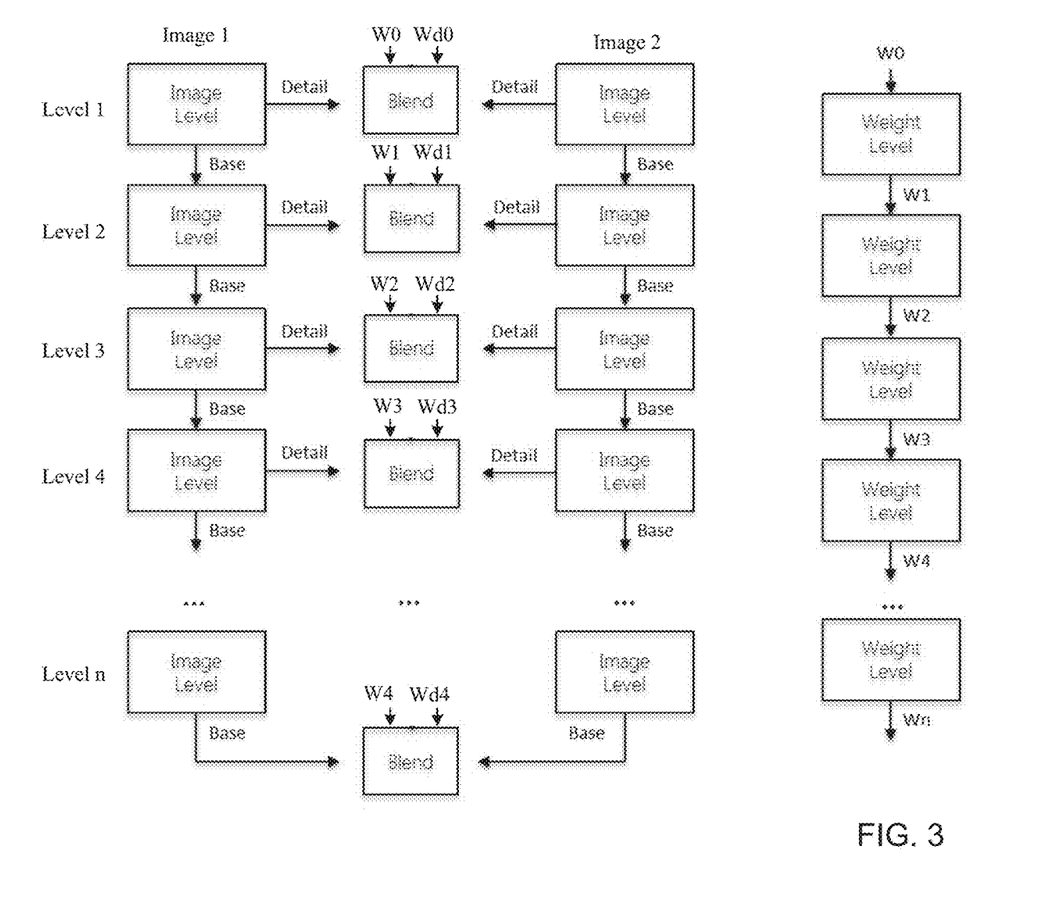
FIG. 3 is a diagram showing blending using weights for different levels associated with multiple images.

Turning now to FIG. 3, a diagram shows blending using weights for different levels associated with blending pyramid for multiple images, where Images 1 and 2 may be implemented as described above as representing images from different cameras having different exposures, and which could be multi-frame images. Alternatively, Image 1 and Image 2 can be captured by a single camera, where the multiple images may have different exposure characteristics. The pair of images is passed along with a set of blending weights that defines how the input images should be mixed together to form the output image. At each level of the pyramid, the input image may be divided into a base image and a detail image. The base image is a low-resolution version of the input image, while the detail contains the high-pass information. The base image is passed as the input to the next level of the pyramid. After all levels are computed, there is one low resolution base image and a set of detail images from the pyramid.

In a reconstruction pyramid, when the base and detail images are combined together, the original input image is reconstructed. For the blending application, each level of the image pyramid also contains a blending block that combines information from both input images to create a blended detail image. The lowest level of the pyramid contains the low frequency views of the two input images. These are also blended together to form the blended base layer. The blended base layer along with the blended detail layers from the blending pyramid are given to the reconstruction pyramid to form the final blended output image. It should be noted that the correction for transition affects such as the halo affect may be performed during the blending process, rather than after blending is completed. According to one implementation, the blending pyramid may comprise 8 levels, where blending may be performed in certain levels. For example, blending at the portion of the image that is detected as having a transition artifact may not be performed in the top 3 levels having the highest resolution (i.e. Levels 1-3 of the example of FIG. 3) to avoid loss of texture. Blending may also be avoided in the lowest level (i.e. level n), which is generally a blurry version of the images and is used for identifying locations of transition artifacts. By way of example, if n=8, each pixel of the images in the eight level would represent 256×256 pixels in the original image, and therefore have a considerably lower resolution. As shown in FIG. 3, the weights are generated on the right, and are used to enable blending. Unlike in conventional devices that receive only weights, the blending according to the implementation of FIG. 3 uses both the weight W0-Wn and a derivative weight Wd0-N (designated generally as Wdi for a given level i), as will be described in more detail below. While blending pyramids are shown by way of example, it should be understood that the circuits and methods for processing image data in a composite image could be employed with any multi-scale blending operation.

Figure 4:
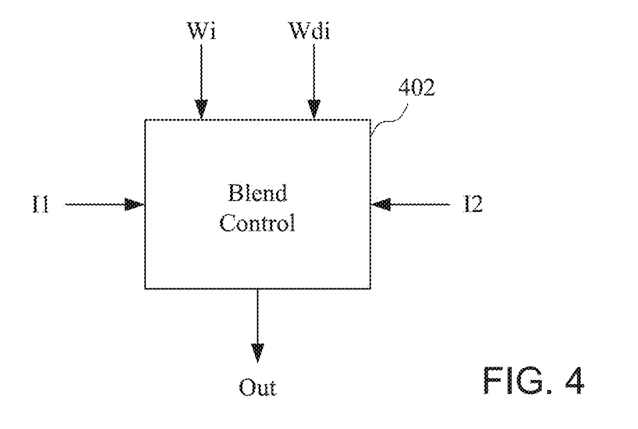
FIG. 4 is a block diagram for generating a blended output image based upon two input images.

Turning now to FIG. 4, a block diagram of a blending control block 402 for generating a blended output image based upon two input images is shown. The blending control block 402 could be used to generate an output image based upon the blending pyramid at multiple levels as shown FIG. 3. The blending control block 402 receives a plurality of images, shown here by way of example as a first image (I1) and a second image (I2). The blending control block 402 also receives weight values (Wi and Wdi) that are applied to the images at different levels as described above in reference to FIG. 3 to generate a blended output image (Out). Weight value Wi represents a weight map, where the weight value Wi that describes for each level the weight from a first image. Wdi represents a high pass interpolation, and is used to determine attenuation values, as will be described in more detail below.

Figure 5:
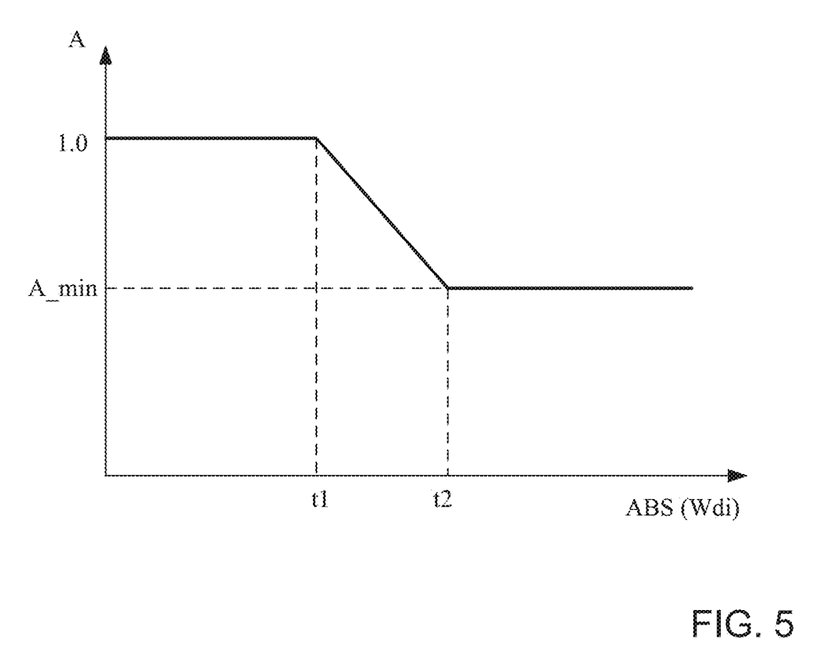
FIG. 5 is a graph showing the application of an attenuation signal for the two input images of FIG. 4.

As shown in the graph of FIG. 5, an attenuation value A for the two input images of FIG. 4 can be generated for each level based upon a value of Wdi. That is, each level may have a different attenuation value A based upon different values of Wdi for the different levels. Further, the equation or equations for determining the different attenuation values may be different for each level (i.e. the graph of FIG. 5 may be different for each level). The method to correct the halo artifact is based upon detecting large transitions in the blending weights at each pyramid level. According to the circuits and methods for processing image data in a composite image, each weight level should produce a detail output along with the base output. The Wdi value provides a derivative or amount of change in the weights at each blending level. According to one implementation, the blending pyramid could be a Laplacian pyramid. When amount of change in the weights for a given portion of an image is large, there is potential for halo to occur. In order to correct for this halo effect, an attenuation gain is provided at that portion of the image to the output detail level of the same pyramid. By attenuating or suppressing the blended detail level, the blended output is prevented from creating halo overshoot. Wdi represents the detail output from the weight pyramid at the current level I, and may comprise a second derivative associated with a Laplacian function. That is, Wi may comprise a first derivative of the pixels of the image and Wdi may comprise a second derivative of the pixels of the image, and represents a difference with respect to the image of the layer above having a higher resolution. An output generated by the blend control circuit 402 could be represented by:

$$\text{Out}=(Wi*I1+(1-Wi)*I2)*A \qquad (1)$$

The attenuation factor, A, may be computed using a linear curve, as shown in FIG. 5. According to one implementation, the attenuation value can be calculated as follows:

$$y=1-m(x-t_1), \qquad (2)$$

where the slope $m$ can be:

$$m=(1-A_{min})/(t_2-t_1) \qquad (3).$$

Therefore, the blended output in the regions identified as having transition artifacts are attenuated by multiplying the standard output for that level by an attenuation value A that is less than or equal to one. According to one implementation, the value of A may be equal to 1.0 until a first threshold value t1 associated with a Wdi value, and then decrease to a minimum of $A_{min}$ until a second threshold value t2 is achieved.

In order to determine values of t1 and t2, a difference image Wd is determined, where $$Wi - Wdi = Wd, \quad (4)$$

where Wi may be based upon an input image to a low pass filter (the output of which is a downsampled image) and Wdi is based upon an upsampled version of the corresponding downsampled Wi image. According to one implementation, the Wdi values may be generated after a Laplacian transform for example (in order to generate a difference image based upon images of the same resolution). The values of t1 and t2 are selected so that the resulting difference image Wd avoids halo effects at transition edges between light and dark areas. While a Laplacian technique may be employed, other techniques such as wavelet decomposition could be used instead.

The parameters (i.e. controllable thresholds Amin, t1 and t2)) of the graph of FIG. 5 may be tunable and may be different for each level of the pyramid. The blend control circuit 402 provides an attenuation factor as the detail inputs are blended. At the highest levels of the pyramid, the detail information also contains important information about image texture and fine details. The technique for blending using the Wdi values may be selectively applied. For example, it may not applied at one or more high resolution levels to avoid losing these important details. The parameters may also be changed based upon a scene, where the parameters are optimized for the scene. According to one implementation, a library of parameters may be stored, where a group of parameters from the library are selected based upon a determination of a features the scene. As the images come in, the parameters can be selected, such as on an image-by-image basis, to be applied to perform blending.

Figure 6:
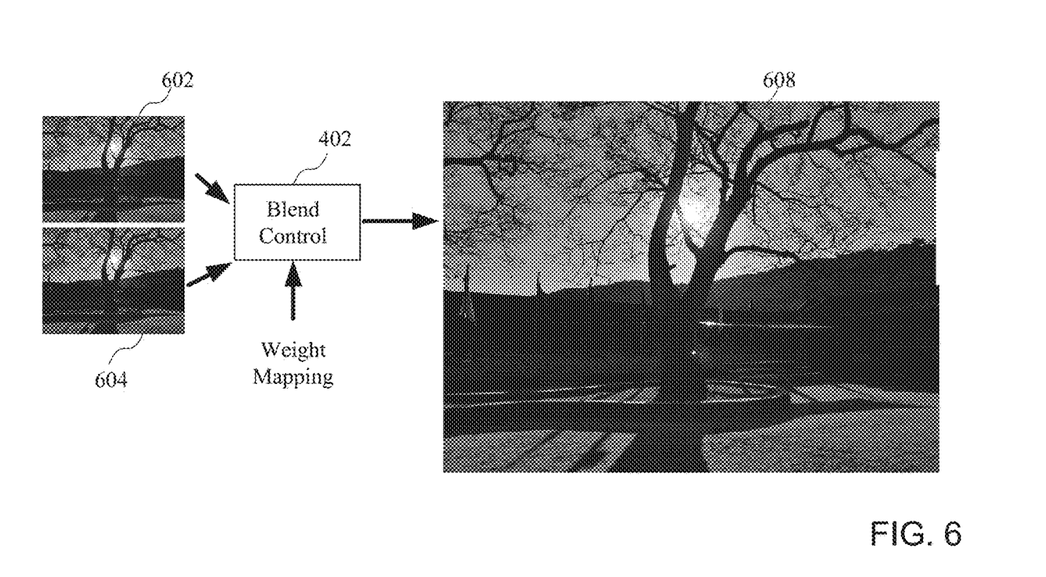
FIG. 6 shows an example of images that are blended to form an output image having reduced halo effect.

Turning now to FIG. 6, an example images that are blended to form an output image having reduced halo effect is shown. As shown in FIG. 6, The blend control block receives the two images 602 and 604, and a weight mapping 606 as described above to generate an output image 608. As can be seen, the hard transitions between areas of light and dark in the generate output image 608 has reduced halo effect.

Figure 7:
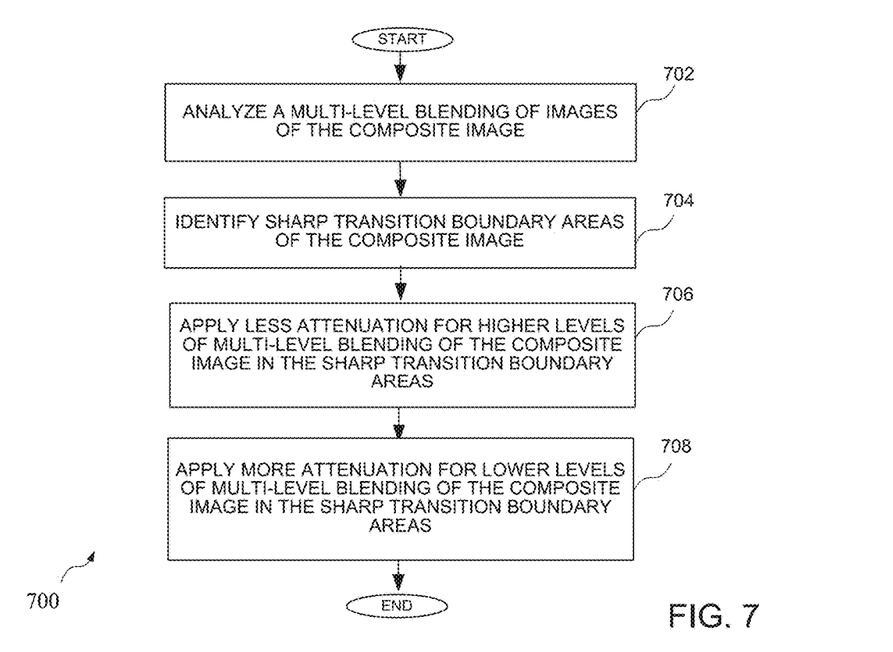
FIG. 7 is a flow diagram showing a method of processing image data in a composite image.

Turning now to FIG. 7, a flow diagram shows a method of processing image data in a composite image. A multi-level blending of images of the composite image is analyzed at a block 702, such as by using Wdi values as described above. Sharp transition boundary areas of the composite image are identified at a block 704. Less attenuation is applied for higher levels of multi-level blending of the composite image in the sharp transition boundary areas at a block 706. In some cases, no attenuation may be applied at certain levels More attenuation is applied for lower levels of multi-level blending of the composite image in the sharp transition boundary areas at a block 708.

According to some implementations, analyzing a multi-level blending of images may comprise analyzing a pyramid blending of images of the composite image. The method may also comprise selectively applying attenuation at pre-determined levels of the plurality levels, including applying attenuation using controllable thresholds. For example, the controllable thresholds may comprise a first threshold for starting attenuation, a second threshold for ending attenuation, and a minimum attenuation value applied during attenuation. Different controllable thresholds may be applied to different levels of a pyramid blending of the images of the composite image. The method may also comprise generating a blended output of the images of the composite image after applying less attenuation for higher levels of multi-level blending of the composite image in the sharp transition boundary areas and applying more attenuation for lower levels of multi-level blending of the composite image in the sharp transition boundary areas. While specific elements of the method are described, it should be understood that additional elements of the method, or additional details related to the elements, could be implemented according to the disclosure of FIGS. 1-6.

Accordingly, the halo attenuation technique may be implemented as a modification to a conventional blending standard algorithm. However, the same technique can be applied in any blending algorithm where there is a distinction between base level image and detail level image. Modification of the details at lower resolutions reduces the halo effect because the halo is an artifact that affects very high-level transitions in a scene. The technique is presented in the context of high dynamic range imaging where multiple exposures are captured to increase the dynamic range of the combined image output. The technique can also be used to help reduce artifacts when combining flash and no flash images for example. The technique avoids overshoots and undershoots around transition regions between different exposures.

It can therefore be appreciated that new circuits for and methods of implementing a device having cameras with focal lengths has been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of processing image data in a composite image, the method comprising:
   analyzing a multi-level blending of images of the composite image;
   identifying sharp transition boundary areas of the composite image;
   applying less attenuation, using a processor, for higher levels of multi-level blending of the composite image in the sharp transition boundary areas; and
   applying more attenuation, using the processor, for lower levels of multi-level blending of the composite image in the sharp transition boundary areas.

2. The method of claim 1, wherein analyzing a multi-level blending of images comprises analyzing a pyramid blending of images of the composite image.

3. The method of claim 2, wherein applying less attenuation for higher levels of multi-level blending of the composite image and applying more attenuation for lower levels of multi-level blending of the composite image comprises selectively applying attenuation at predetermined levels of the higher levels and the lower levels.

4. The method of claim 1, wherein applying less attenuation for higher levels of multi-level blending of the composite image and applying more attenuation for lower levels of multi-level blending of the composite image comprises applying attenuation using controllable thresholds.

5. The method of claim 4, wherein the controllable thresholds comprise a first threshold for starting attenuation, a second threshold for ending attenuation, and a minimum attenuation value applied during attenuation.

6. The method of claim 4, wherein different controllable thresholds are applied to different levels of a pyramid blending of the images of the composite image.

7. The method of claim 1, further comprising generating a blended output of the images of the composite image after applying less attenuation for higher levels of multi-level blending of the composite image in the sharp transition boundary areas and applying more attenuation for lower levels of multi-level blending of the composite image in the sharp transition boundary areas.

8. A device for enhancing quality of an image, the device comprising:
a processor circuit configured to:
analyze a multi-level blending of images of a composite image;
identify sharp transition boundary areas of the composite image;
apply less attenuation for higher levels of multi-level blending of the composite image in the sharp transition boundary areas; and
apply more attenuation for lower levels of multi-level blending of the composite image in the sharp transition boundary areas.

9. The device of claim 8, wherein analyzing a multi-level blending of images comprises analyzing a pyramid blending of images of the composite image.

10. The device of claim 9, wherein applying less attenuation for higher levels of multi-level blending of the composite image and applying more attenuation for lower levels of multi-level blending of the composite image comprises selectively applying attenuation at predetermined levels of the higher levels and the lower levels.

11. The device of claim 8, wherein applying less attenuation for higher levels of multi-level blending of the composite image and applying more attenuation for lower levels of multi-level blending of the composite image comprises applying attenuation using controllable thresholds.

12. The device of claim 11, wherein the controllable thresholds comprise a first threshold for starting attenuation, a second threshold for ending attenuation, and a minimum attenuation value applied during attenuation.

13. The device of claim 11, wherein different controllable thresholds are applied to different levels of a pyramid blending of the images of the composite image.

14. The device of claim 8, further comprising generating a blended output of the images of the composite image after applying less attenuation for higher levels of multi-level blending of the composite image in the sharp transition boundary areas and applying more attenuation for lower levels of multi-level blending of the composite image in the sharp transition boundary areas.

15. A non-transitory computer-readable storage medium having data stored therein representing software executable by a computer for enhancing quality of an image, the non-transitory computer-readable storage medium comprising:
analyzing a multi-level blending of images of a composite image;
identifying sharp transition boundary areas of the composite image;
applying less attenuation for higher levels of multi-level blending of the composite image in the sharp transition boundary areas; and
applying more attenuation for lower levels of multi-level blending of the composite image in the sharp transition boundary areas.

16. The non-transitory computer-readable storage medium of claim 15, wherein analyzing a multi-level blending of images comprises analyzing a pyramid blending of images of the composite image.

17. The non-transitory computer-readable storage medium of claim 16, wherein applying less attenuation for higher levels of multi-level blending of the composite image and applying more attenuation for lower levels of multi-level blending of the composite image comprises selectively applying attenuation at predetermined levels of the higher levels and the lower levels.

18. The non-transitory computer-readable storage medium of claim 15, wherein applying less attenuation for higher levels of multi-level blending of the composite image and applying more attenuation for lower levels of multi-level blending of the composite image comprises applying attenuation using controllable thresholds.

19. The non-transitory computer-readable storage medium of claim 18, wherein the controllable thresholds comprise a first threshold for starting attenuation, a second threshold for ending attenuation, and a minimum attenuation value applied during attenuation.

20. The non-transitory computer-readable storage medium of claim 18, wherein different controllable thresholds are applied to different levels of a pyramid blending of the images of the composite image.

* * * * *